May 28, 1963 H. M. R. DE GAIGNERON DE MAROLLES 3,091,041
ATOM AND MOLECULAR MODELS
Filed March 1, 1960 6 Sheets-Sheet 1
FIG.1
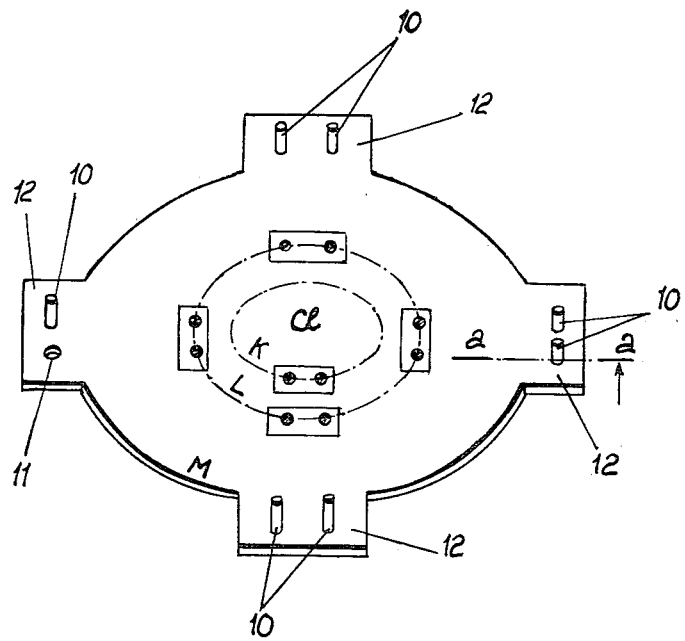
FIG.2
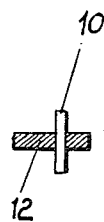
FIG.3
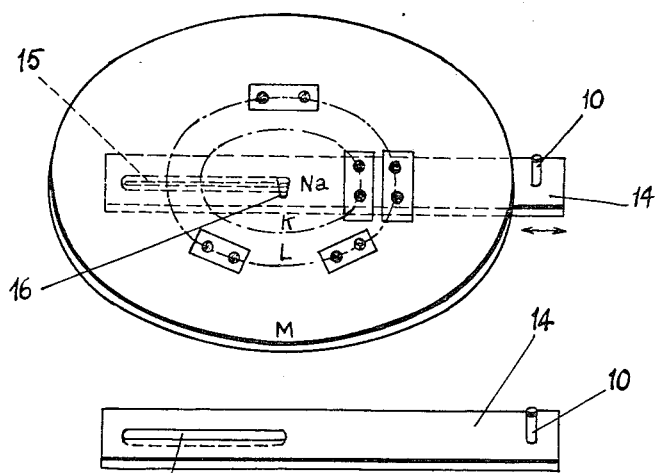
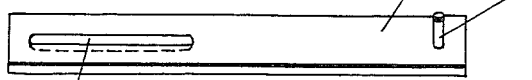
FIG.4

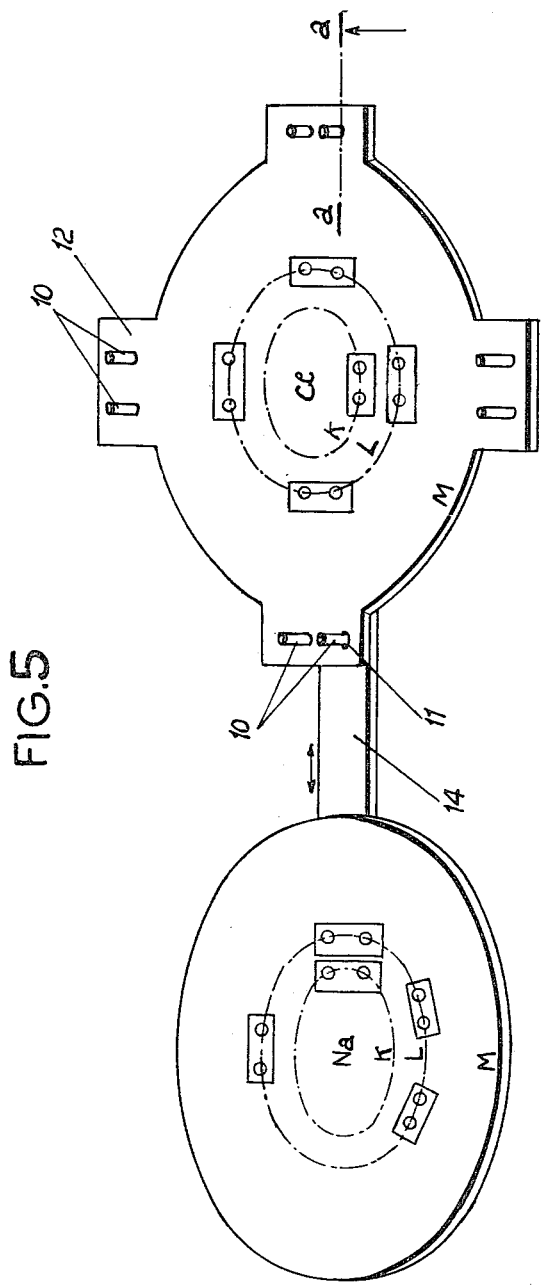

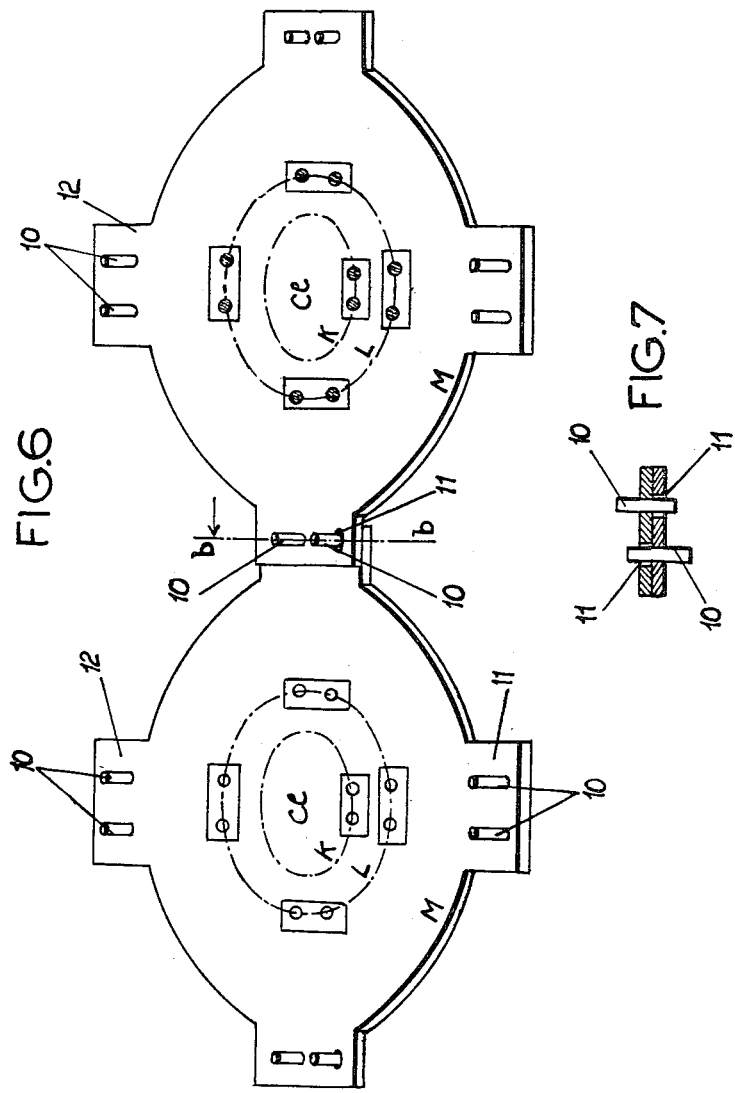

May 28, 1963  H. M. R. DE GAIGNERON DE MAROLLES  3,091,041
ATOM AND MOLECULAR MODELS
Filed March 1, 1960

May 28, 1963 H. M. R. DE GAIGNERON DE MAROLLES 3,091,041
ATOM AND MOLECULAR MODELS
Filed March 1, 1960 6 Sheets-Sheet 5

May 28, 1963 H. M. R. DE GAIGNERON DE MAROLLES 3,091,041
ATOM AND MOLECULAR MODELS
Filed March 1, 1960 6 Sheets-Sheet 6

United States Patent Office 3,091,041
Patented May 28, 1963

3,091,041
ATOM AND MOLECULAR MODELS
Hélène Marie Renée de Gaigneron de Maroilles,
45 Rue Henri Heine, Paris, France
Filed Mar. 1, 1960, Ser. No. 12,118
4 Claims. (Cl. 35—18)

This invention relates generally to teaching models and more particularly to structural molecular or atomic models usable for representing chemical substances of an elementary kind and on which the electronic characteristics of the substances are reproduced.

The models can be used in teaching pupils, by an amusing method of learning.

One of the objects of the invention is to alter these molecular models by means of projections or arms for representing the valencies of elementary chemical substances.

Another object of the invention is to obtain, by means of these models assemblies in various planes, these assemblies taking place simply by means of pins cooperating with holes.

A device according to the invention is shown, by way of nonrestrictive example, in the attached drawings, in which:

FIGURE 1 is a perspective view of a model representing a chlorine atom;

FIGURE 2 is a sectional view along the line a—a of FIGURE 1;

FIGURE 3 is a perspective view of a model representing a sodium atom;

FIGURE 4 is a perspective view of an arm;

FIGURE 5 is a perspective view of models united by "electro-valency" or ionic bonds;

FIGURE 6 is a perspective view of atomic model bonded by "co-valency" or covalent bonds;

FIGURE 7 is a section along b—b of FIGURE 6;

Figure 8:
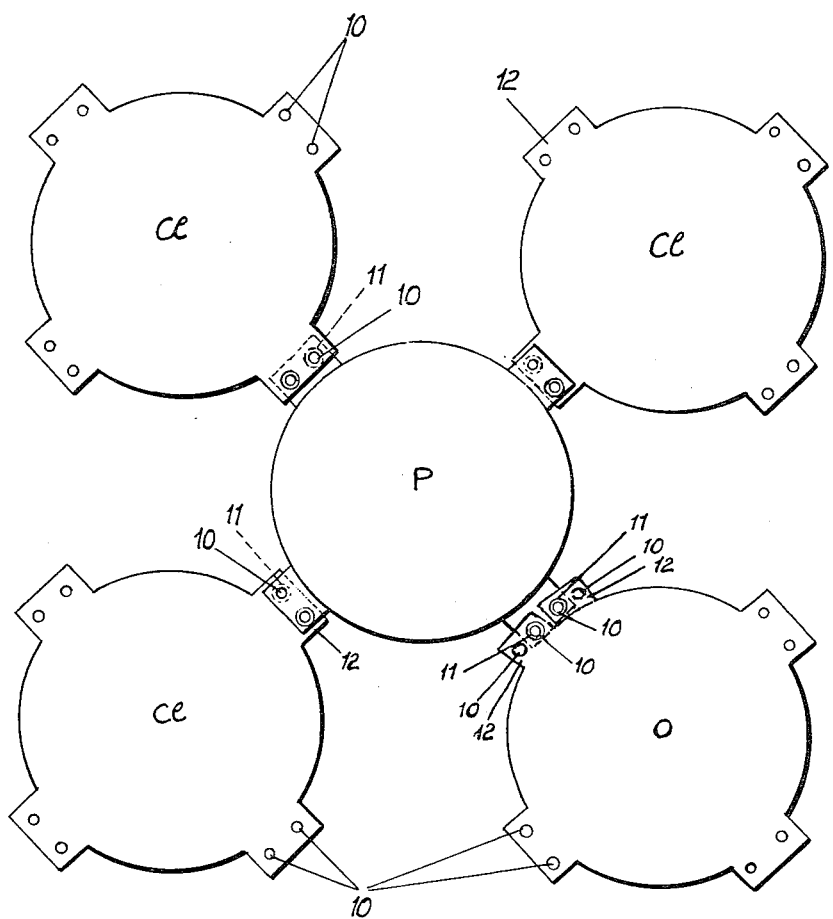
FIGURE 8 is a view from above of a plurality of atomic models forming a molecular structure.

The models represented in the attached figures and which symbolize atoms of single bodies, comprise, on the one hand, nipples or pins 10 representing electrons, on the other hand, holes 11 representing in an energy level a point able to receive an electron and representing, as it were, a negative valence.

These pins 10 and holes 11 are situated on the tabs or projections 12 provided on the periphery of the models which have planar bodies.

Thus, in the case of chlorine (FIGURE 1) the model comprises four peripheral projections 12 each provided with two pins 10 except one (the one on the extreme left of FIGURE 1) which has a pin 10 and a hole 11. This symbolizes the fact that the outer energy level M of the chlorine atom is not filled; it possesses seven electrons (the seven electrons 10) and can receive an eighth (in the place of the hole 11).

The pin 10 symbolizing an electron is formed by a small cylindrical rod or an olive-shaped knob firmly thrust into a hole in the model body portion and jutting out on either side of the latter.

The engaging of a pin of a model in a hole in another model will symbolize the connection between the two atoms represented by these models to form a molecular structure model. An electron of the first model takes free place in the outer energy level of the second.

In the case of FIGURE 3 (sodium atom), the pin 10 is placed at the end of an arm 14 which can move radially in relation to the counter. This symbolizes the fact that the sodium atom possesses, on its energy level M, an electron pin 10 able to escape and go into another atom.

The arm 14 is formed by an oblong rectangular tongue-piece pierced with a longitudinal groove 15 along its longitudinal axis.

This groove permits sliding of the arm along a point 16 situated in the axis of the model and below the latter.

When the arm 14 is pulled out to its maximum extent in relation to the model, this signifies that the electron has a strong tendency to escape, hence, that the bond with another atom is not very strong. In the contrary case, where the arm 14 is retracted to the maximum in relation to the counter, this signifies that the electron has only a slight tendency to escape, hence, the bond with another atom is a strong one.

With the counters described above, various combinations of atoms with each other can be carried out. Hence, in a condition in which two atom models are joined the strength of their bond can be denoted. In a single atom model the arm can denote the attractive force of the nucleus for the outer electrons. That is to say, the effect of the shielding by the electrons of the inner energy levels is denoted. This can be represented variably since the arms can be extended variably.

In this manner, in the case of FIGURE 5, an electro-valency bond has been effected by inserting the pin 10 of the sodium counter in the hole 11 of the chlorine counter; the two counters thus assembled symbolize a molecule of sodium chloride NaCl. The arm 14 is completely pulled out to show that the link is not very strong.

In FIGURE 6, a co-valency bond between two chlorine atoms is shown. On one of the chlorine atom models the pin 10 adjacent of the hole 11 is engaged, from above, in the hole 11 of the second model, whereas the pin 10 of this second atom model close to the hole 11, is engaged from below, in the hole 11 of the first atom model (FIGURE 7). Here, the bond taking place by sharing electrons is very strong.

In the case of FIGURE 8, a coordinate bond is symbolized between a phosphorus atom and an oxygen atom.

For a chlorine atom model united by a covalent bond to a phosphorus atom model, the hole 11 of a chlorine model engages from below, in the pin 10 of the phosphorus model whereas the hole 11 of the phosphorus model engages from above in the pin 10 of the chlorine counter.

For an oxygen atom model united by a coordinate bond to the phosphorus atom model two of its holes 11 engage in two adjacent pins of the phosphorus atom model.

The possibility of rotating the arms 14 around the point 16 enables these arms to be directed for obtaining bonds between atom models.

The atom or atomic models in question are placed, for example, on a sloping board (similar to the blackboard used in schools).

The models will be fixed on this board in a removable manner, for example, by means of pins (in this case, the board would be cork or wood), or small magnets integral with the models (in this case, the board would be magnetized) or suction-disks may be attached to the backs of the models.

Figure 9:
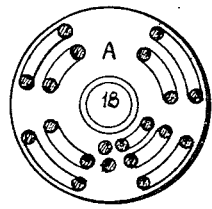
FIGURES 9 and 10 are perspective views of models representative of two forms of embodiment of an atom of rare gas.
Figure 10:
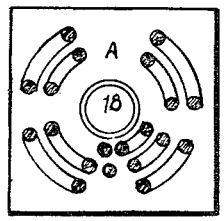

Atoms of rare gases (argon, krypton, etc.) are represented by a circular model (FIGURE 9) or a square model (FIGURE 10) without peripheral tabs or arms.

Figure 13:
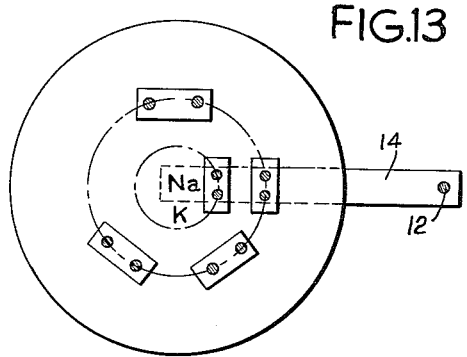
FIGURES 11, 12 and 13 are plan views of other forms of embodiment of models.
Figure 11:
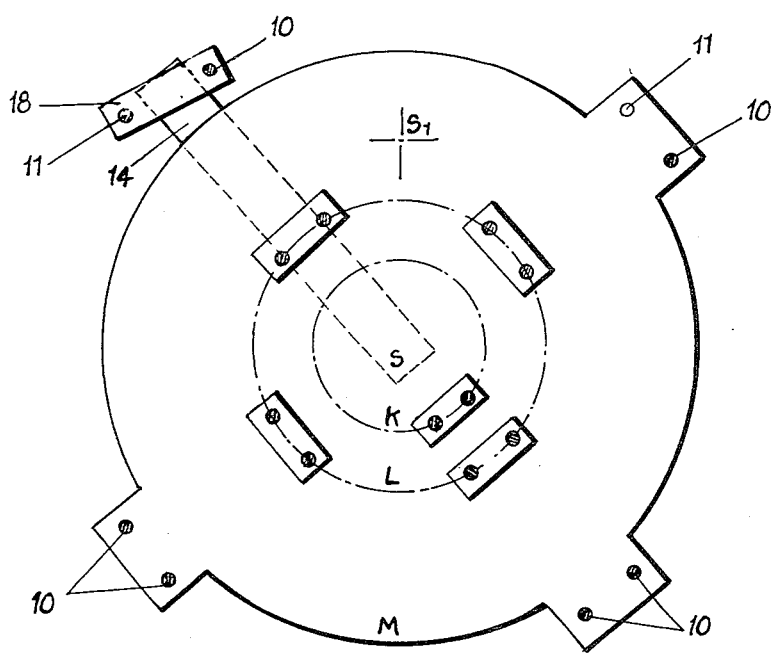
Figure 12:
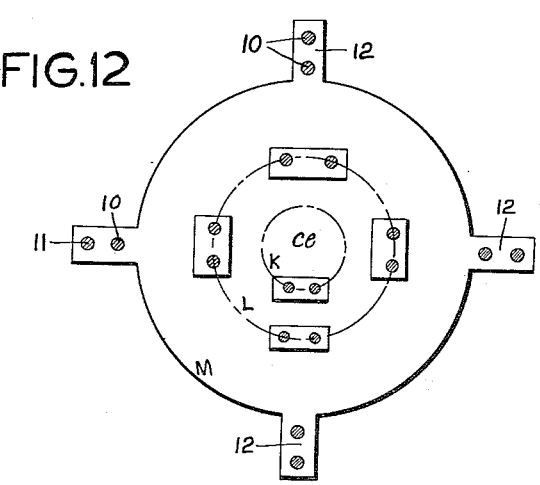

According to another method of embodiment of the invention, the holes 11 on a movable arm 14 near to a pin 10, are not placed on the arm 14 itself but on an attached arm 18 pivotally mounted around the end of this arm 14. To this end, the attached arm 18 is pierced with an aperture whereby it is attached to the arm, by any kind of means, such, for example, as a groove 15 arranged on the axis of the arm 14, at the end of the latter (FIGURE 11). According to another method of embodiment of the invention shown in FIGURES 12 and 13, the pins 10 and holes 11 of a same pair, are not placed side by side according to the periphery of the model, but according to a radial axis of the latter.

Finally, the arm 14 can be pivotally mounted, not in the center of the model but according to an offset axis or eccentrically.

With the atom models made according to the above-mentioned forms of embodiment, it is of course possible to produce all kinds of molecular structural models (electro-valency, co-valency, coordinancy) in a manner similar to that described above.

According to a simplified form of embodiment of the invention, the models do not have any inscription on their surfaces (name, symbol, energy levels or orbitals). They have various colors, each color corresponding to a well-defined element. For example, the atom model representing the sulphur atom would be yellow, that representing the chlorine atom would be greenish-yellow, etc.

The models connected with the present invention have an interesting application in illustrating the Mendeléeff Periodic Table.

Figure 14:
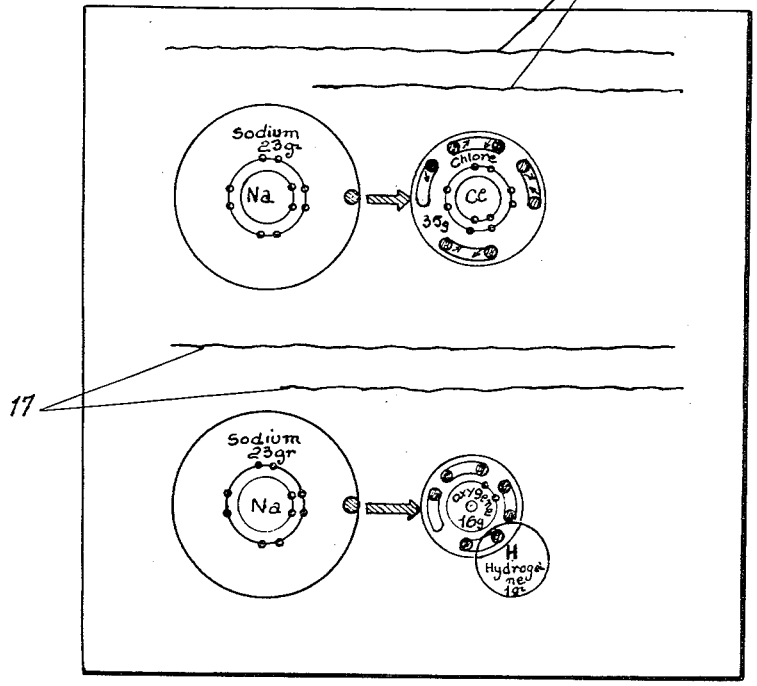
FIGURE 14 is a plan view of a board that can be used in the game.

FIGURE 14 relates to a board that can be used in the invention. On one of the faces of this board, at the top part, models are drawn representing atoms whose assembly symbolizes a solid (in the case of FIGURE 14, sodium chloride), at the bottom part, models representing atoms whose assembly into molecular structures symbolizes the product obtained from the above-mentioned solid (in the case of FIGURE 14, caustic soda), always giving their formula.

Inscriptions 16 and 17, respectively placed over the various groups of the preceding models give the characteristics with regard to the product.

Another interesting application consists of illustrating the periodical classification of elements by means of the models described above.

What I claim is:

1. A model of a molecule of a substance comprising, a plurality of models of atoms of at least one element forming the molecule of said substance, each model of an atom comprising a planar body portion, means connected to said body portion representative of the valence of said atom having a plurality of holes representative of the absence of an electron in said atom in a position representative of an energy level, including the outermost energy level a plurality of upstanding pin members representative of electrons of said atom receivable in said holes, the last-mentioned means connected to said atom body portion being disposed peripherally of said body portion for joining said atom model with another atom model by insertion of said pin members upstanding in a respective hole in the means representative of the valence of said other atom to represent the type of bond formed between the atoms, thereby to represent a molecule of said substance with joined atom models.

2. A model of a molecule of a substance comprising, a plurality of models of atoms of at least one element forming the molecule of said substance, each model of an atom comprising a planar body portion, means connected to said body portion representative of the valence of an atom having at least one hole in a position representative of an energy level, at least one of said models of an atom having an arm connected to said body portion and extensible variably radially relative thereto for variably representing the attractive force applied to electrons of the atom represented by the model and having at least one hole in a position representative of an energy level, at least one pin member representative of an electron of said atom receivable in said hole, the first-mentioned means connected to said atom body portion being disposed peripherally of said body portion for joining said one model with another atom model by insertion of said pin member upstanding in a hole in said arm of said other atom said arm having means for extending it variably through a range of radial lengths, thereby to represent a molecule of said substance with the joined atom models and the type and strength of bond between said atoms.

3. A model of a molecule of a substance comprising, a plurality of models of atoms of at least one element forming the molecule of said substance, each model of an atom comprising a planar body portion, means connected to said body portion representative of the valence of an atom having at least one hole in a position representative of an energy level, at least one of said models of an atom having an arm pivotally connected to said body portion and extensible variably radially relative thereto for variably representing the strength of the bond formed by the atom represented by the model and having at least one hole in a position representative of an energy level, at least one pin member representative of an electron of said atom receivable in said hole, the first-mentioned means connected to said atom body portion being disposed peripherally of said body portion for joining said one model with another atom model by insertion of said pin member upstanding in a hole in the arm of said one atom, thereby to represent a molecule of said substance with the joined atom models.

4. A model of a molecule of a substance comprising, a plurality of models of atoms of at least one element forming the molecule of said substance, each model of an atom comprising a planar body portion, means connected to said body portion representative of the valence of an atom having at least one hole in a position representative of an energy level, at least one of said models of an atom having an arm connected to said body portion and extensible variably radially relative thereto, for variably representing the strength of the bond the atom forms with other atoms, said arm having a pivoted crosspiece having at least one hole in a position representative of an energy level, at least one pin member representative of an electron of said atom receivable in said holes, the first-mentioned means connected to said atom body portion being disposed peripherally of said body portion for joining said one model with another atom model by insertion of said pin member upstanding in a hole in the arm of said one atom, thereby to represent a molecule of said substance with the joined atom models and the strength of the bond between them.

References Cited in the file of this patent

UNITED STATES PATENTS

| | | |
|---|---|---|
| 242,821 | Farmer | June 14, 1881 |
| 2,942,356 | Weintraub | June 28, 1960 |
| 2,961,779 | Perry | Nov. 29, 1960 |

FOREIGN PATENTS

| | | |
|---|---|---|
| 864,090 | France | Jan. 8, 1941 |
| 1,168,727 | France | Sept. 1, 1958 |
| 1,037,735 | Germany | July 16, 1952 |